United States Patent
Milanovich et al.

(10) Patent No.: US 7,493,808 B2
(45) Date of Patent: Feb. 24, 2009

(54) FILL-THROUGH TIRE PRESSURE INDICATOR

(75) Inventors: Philip John Milanovich, Phoenix, AZ (US); John Kostin Milanovich, Apt. 203, 1126 N. 15th Ave., Bozeman, MT (US) 59715-3266; Michael Jurgen Strasser, San Francisco, CA (US); Clinton Neal Slone, San Francisco, CA (US); William Gregory Tammen, Lafayette, CA (US)

(73) Assignee: John Kostin Milanovich, Bozeman, MT (US)

( * ) Notice: Subject to any disclaimer, the term of this patent is extended or adjusted under 35 U.S.C. 154(b) by 0 days.

(21) Appl. No.: 11/674,135

(22) Filed: Feb. 12, 2007

(65) Prior Publication Data

US 2008/0190189 A1  Aug. 14, 2008

(51) Int. Cl.
*B60C 23/02* (2006.01)

(52) U.S. Cl. .................................. 73/146.8; 116/34 R (58) Field of Classification Search ............... 73/146.8, 73/146; 137/226, 227; 340/442, 444; 116/34
See application file for complete search history.

(56) References Cited

U.S. PATENT DOCUMENTS

| | | | |
|---|---|---|---|
| 3,670,688 A | 6/1972 | Seaberg | |
| 3,866,563 A * | 2/1975 | Bluem | ...................... 116/34 R |
| 3,990,467 A | 11/1976 | Sargent | |
| 4,193,295 A | 3/1980 | Curran | |
| 4,244,214 A | 1/1981 | Curran | |
| 4,310,014 A | 1/1982 | Parker | |
| 4,951,501 A * | 8/1990 | MacAnally et al. | ......... 73/146.8 |
| 5,014,643 A | 5/1991 | Huang | |
| 5,027,848 A * | 7/1991 | Leeuwen | ..................... 137/227 |
| 5,339,764 A | 8/1994 | Singbartl | |
| 5,365,967 A | 11/1994 | Moore | |
| 5,386,794 A | 2/1995 | Foss et al. | |
| 5,569,849 A | 10/1996 | Cummings | |
| 5,687,672 A * | 11/1997 | Gabriel | ..................... 116/34 R |
| 5,819,779 A * | 10/1998 | Takemura et al. | ........... 137/229 |
| 5,886,254 A * | 3/1999 | Chi | .......................... 73/146.8 |
| 5,979,232 A * | 11/1999 | Halcomb | .................... 73/146.8 |
| 6,055,854 A * | 5/2000 | Chen | ........................ 73/146.8 |
| 6,293,297 B1 | 9/2001 | Maldonado et al. | |
| 6,302,138 B1 | 10/2001 | Sumrall | |
| 6,374,666 B1 * | 4/2002 | Lemberger et al. | ......... 73/146.8 |
| 6,525,655 B2 * | 2/2003 | Huang | ........................ 340/442 |
| 6,629,454 B2 * | 10/2003 | Lundqvist | .................. 73/146.8 |
| 6,911,903 B2 | 6/2005 | Gladstone et al. | |

* cited by examiner

*Primary Examiner*—Andre J Allen
(74) *Attorney, Agent, or Firm*—Swift Law Office; Stephen Christopher Swift (57) ABSTRACT

A tire pressure indicator that is combined with a fill valve. The indicator and the fill valve are coaxial or concentric. The invention may be screwed onto a tire valve stem. The indicator has three bands or sections, each of which is a different color, for indicating whether tire pressure is within a predetermined range, above that range, or below that range. The colors are viewed through a lens, aided by a mirror. A diaphragm pushes the indicator up when pressure rises, while a spring pushes the indicator down when pressure drops. A tire may be inflated or deflated while the invention is mounted on a tire stem. During inflation, the pin in an air chuck at the end of an air hose may depress a valve pin assembly to open the fill valve. A user may deflate the tire by manually depressing the valve pin assembly to release air.

5 Claims, 6 Drawing Sheets

FIG. 1

DETAIL A
SCALE 3 : 1

DETAIL B
SCALE 8 : 1
FIG. 5

DETAIL C
SCALE 8 : 1
FIG. 6

DETAIL D
SCALE 8 : 1
FIG. 7

DETAIL E
SCALE 8 : 1
FIG. 8

FILL-THROUGH TIRE PRESSURE INDICATOR

BACKGROUND OF THE INVENTION

1. Field of the Invention

The present invention relates to pressure indicators combined with fill valves.

The motoring public is generally aware of the need to have tire properly inflated for optimum tire life and performance. Under-inflated tires (or over-inflated tires) wear more quickly and degrade the handling characteristics of a motor vehicle. The tedium of measuring the pressure in each tire causes many drivers to forego measuring the pressure in their tires and to rely on a visual inspection. However, mere visual inspection is inadequate, particularly when a car has radial tires, because a sidewall bulge is present even in properly inflated tires. The importance of properly inflated tires was acknowledged by the federal government with the passage of the TREAD Act. It mandates cars have a tire pressure management system. These are electrical in nature and it would be an advantage to have tire pressure indication that is independent of the car's electrical system to act as a backup.

It will be easier for consumers to maintain the correct pressure in their tires, if pressure indicators can be mounted onto tire valve stems and left in place when inflating the tires. Color-coding may make it easier to determine when the tire pressure is correct, especially in poorly lighted areas, or for visually impaired people.

2. Description of the Prior Art

U.S. Pat. No. 3,670,688, issued on Jun. 20, 1972, to Lewis A. Seaberg, discloses a color-coded tire pressure indicator that is mounted in a tire stem. The present invention is distinguishable, in that air can pass through it to inflate the tire.

U.S. Pat. No. 3,866,563, issued on Feb. 18, 1975, to Gary R. Bluem, discloses a color-coded tire pressure indicator that can be screwed onto a tire stem. The tire can be inflated or deflated through the device. A hollow "piston" with color-coding (or other indicia) appears to be concentric with a fill valve. The colors are viewed through concentric beads. The present invention is distinguishable in that the colors are viewed through a lens, with the aid of a mirror. Only the use of two colors is disclosed, to indicate whether the pressure is above or below a certain level. The present invention is distinguishable, in that it uses a third color to indicate that pressure is within a desirable medium range.

U.S. Pat. No. 3,990,467, issued on Nov. 9, 1976, to Neal L. Sargent, discloses a color-coded tire pressure indicator with internal screw threads at one end. The tire can be inflated or deflated through the device. A sliding pressure indicating member with color-coding appears to be concentric with a fill valve. The colors are viewed through a cylindrical window. The present invention is distinguishable in that the colors are viewed through a lens, with the aid of a mirror.

U.S. Pat. No. 4,193,295, issued on Mar. 18, 1980, to William F. Curran, and U.S. Pat. No. 4,224,214, issued on Jan. 13, 1981, to William F. Curran, disclose a color-coded tire pressure indicator that can be screwed onto a tire stem. The tire can be inflated or deflated through the device. An "axially apertured bolt" has three annular bands of different colors for indicating over inflation, proper inflation and under inflation, and appears to be concentric with a fill valve. The colors are viewed through a window in the stem housing. The present invention is distinguishable in that the colors are viewed through a lens, with the aid of a mirror. The present invention is further distinguishable, in that it includes a diaphragm to move the indicator upward as pressure increases.

U.S. Pat. No. 4,310,014, issued on Jan. 12, 1982, to James E. Parker, discloses a tire pressure indicator that is part of a tire stem, but does not disclose the combination of a lens with a mirror or the diaphragm of the present invention.

U.S. Pat. No. 5,014,643, issued on May 14, 1991, to Tien-Tsai Huang, discloses a color-coded tire pressure indicator, that allows air to escape when pressure in the tire is too high, but does not make it possible to inflate the tire when the indicator is mounted on a tire stem, as in the present invention.

U.S. Pat. No. 5,339,764, issued on Aug. 23, 1994, to Günther Singbartl, discloses a device that can use color to indicate the air pressure in a vehicle tire, but does not have means for allowing the tire to be inflated or deflated when the device is mounted on a tire stem, as in the present invention.

U.S. Pat. No. 5,365,967, issued on Nov. 22, 1994, to James C. Moore, discloses a tire pressure indicator, that provides visual indication of over inflation or under inflation, and allows air to escape when pressure in the tire is too high, but does not have means for inflating the tire when the pressure indicator is in place, as in the present invention.

U.S. Pat. No. 5,386,794, issued on Feb. 7, 1995, to Arthur J. Foss and Philip J. Milanovich, discloses a tire pressure indicator, in which air pressure is indicated by the position of a sliding marker in a sleeve attached to the side of a tire valve stem. The present invention is distinguishable, in that the pressure indicator and the fill valve are concentric.

U.S. Pat. No. 5,569,849, issued on Oct. 29, 1996, to Craig Cummings, discloses a tire stem cap that provides a visual indication when air pressure within the tire drops below a set point. The tire cannot be inflated or deflated when the device is mounted on the tire stem, as in the present invention.

U.S. Pat. No. 6,293,297, issued on Sep. 25, 2001, to Brandon Maldonado and Gene Scott, discloses an air valve housing with pressure indicator that can be screwed onto a tire stem. The tire can be inflated or deflated through the device. The pressure indicator has three colored bands for indicating adequate, marginal, and under inflated conditions. The pressure indicator is concentric with a fill valve, though an access means for enabling air pressure reduction is off to one side. The colors are viewed through a window. The present invention is distinguishable in that the colors are viewed through a lens, with the aid of a mirror. The present invention is further distinguishable, in that it includes a diaphragm to move the indicator upward as pressure increases.

U.S. Pat. No. 6,302,138, issued on Oct. 13, 2001, to Dirk Lee Sumrall, discloses tire stem valves with built in pressure regulators and optional air pressure indicators, but does not disclose the combination of a lens with a mirror or the diaphragm of the present invention.

U.S. Pat. No. 6,911,903, issued on Jun. 28, 2005, to Peter Gladstone, discloses a tire pressure indicator that can be mounted on a tire stem, which displays one color when pressure is below a set level, and another color when pressure is above that level. The tire cannot be inflated when the indicator is mounted on the tire stem, as in the present invention.

None of the above inventions and patents, taken either singly or in combination, is seen to describe the instant invention as claimed. In particular:

1. The prior art cited does not disclose the use of a free moving diaphragm with a center hole that allows air to pass through the plane of the diaphragm. The diaphragm has the advantage of being both compact and reliable. Other devices mentioned in the prior art are not as likely to provide an airtight seal under high pressure. Furthermore, non-diaphragm based indicators will likely have varying friction caused by their sealing surfaces, meaning that they will operate inconsistently and inaccurately.

2. The prior art cited does not disclose the use of a mirror to allow an indicator to be viewed from more angles. The present invention uses an angled mirror to allow the indicator to be viewed from both the top and sides. This allows the pressure indication to be viewed regardless of the degree of wheel rotation or the angle that the tire stem protrudes from the rim.

SUMMARY OF THE INVENTION

The present invention is a pressure indicator that is coaxial or concentric with a fill valve. It is designed primarily for automobile tires, but could be used for other inflatable articles. The invention may be screwed onto a tire valve stem. The indicator has three bands or sections, each of which is a different color, for indicating whether tire pressure is within a predetermined range, above that range, or below that range. The colors are viewed through a lens, aided by a mirror. A diaphragm (or any suitable device) pushes the indicator up when pressure rises, while a spring pushes the indicator down when pressure drops.

Accordingly, it is a first object of the invention to provide an easy to see visual means for indicating whether a tire (or other inflatable article) is at, above or below the optimum internal air pressure.

It is a second object of the invention to provide a means that allows users to fill their tires without removing pressure indicators.

It is a third object of the invention to improve highway safety by making it easier for consumers to maintain their tires at the proper pressure.

It is a fourth object of the invention is to reduce the expense to consumers and to reduce the waste of natural resources from having to replace tires that have worn out prematurely due to improper inflation.

It is a fifth object of the invention is to reduce the waste of fuel, and of the natural resources from which the fuel is produced, as the result of improperly inflated tires.

It is a sixth object of the invention is to improve the handling response of a motor vehicle by making it easier to have the tires properly inflated.

It is a seventh object of the invention is to improve the range that a motor vehicle can travel by coasting.

It is an eighth object of the invention is to help maintain proper tire temperature by making it easier to have the tire properly inflated.

It is a ninth object of the invention is to facilitate proper performance of the tire sidewall by making it easier to have the tire properly inflated.

It is a tenth object of the invention is to facilitate the proper performance of the tire tread design by making it easier to have the tire properly inflated.

It is an eleventh object of the invention is to facilitate the proper performance of the tire interphase at the point of contact by making it easier to have the tire properly inflated.

It is a twelfth object of the invention is to ensure the maximum interphase footprint, as determined by tread design, with frozen, wet or dry surfaces.

It is a thirteenth object of the invention is to enhance the safety of impact and minimize damage to motor vehicle tires and wheels from impact with potholes and road debris, by making it easier to have the tires properly inflated.

It is a fourteenth object of the invention is to improve and control load management and weight bearing by making it easier to have the tires properly inflated.

It is a fifteenth object of the invention to facilitate compliance with motor vehicle safety regulations, mining regulations, or other regulations, by making it easier to have the tires properly inflated.

It is a sixteenth object of the invention is to help protect technology that may be attached to a value stem of a tire from damage, by making it easier to have the tire properly inflated.

It is a seventeenth object of the invention is to help insure the integrity of the metal and fiber components of a tire, by making it easier to have the tire properly inflated.

It is an eighteenth object of the invention is to reduce the effect of tire separation as the result of improper inflation.

It is a nineteenth object of the invention is to insure the integrity of the bonding material used to bond various components of the tire into a cohesive unit from failing as the result of improper tire inflation, and to reduce the resulting risk of tire fragmentation.

It is a twentieth object of the invention is to reduce the amount of sidewall checkering and splitting as the result of improperly inflated tires on vehicles with heavy loads that stand for long periods of time without moving.

It is a twenty-first object of the invention is to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings. In the drawings, one and two digit numbers (i.e. 1 or 31) label individual parts, while three digit numbers (i.e. 801) label features of the individual parts.

DETAILED DESCRIPTION OF THE PREFERRED EMBODIMENT

Figure 1:
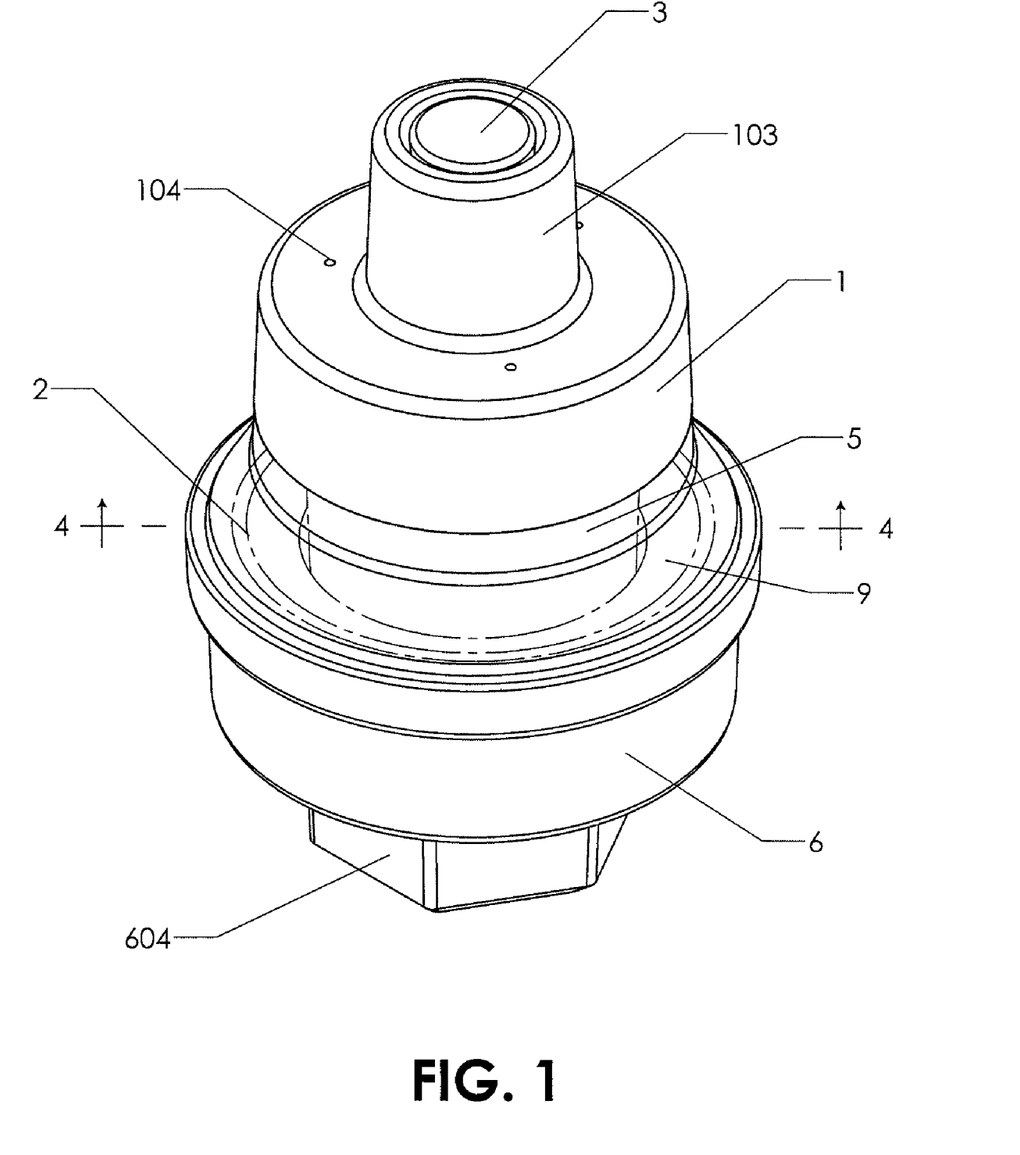
FIG. 1 is an isometric view of the preferred embodiment of the invention.

The present invention is a fill-through pressure indicator for tires (or other inflatable objects), which in its preferred embodiment is a tire stem attachment with a pressure indication sleeve concentric to a fill valve. The following parts are shown in the drawings:

1 Top Case
101 Triangular Extensions
102 Hole in Top Case
103 Extension in Top Case
104 Vent Holes in Top Case
105 Inside of Top Case
107 Ambient Air Pressure Chamber
108 Main Chamber
109 Fill Chamber
2 Lens
3 Valve Pin Assembly
31 Valve Pin Top
32 Valve Pin Spring
33 Valve Pin Seal
34 Valve Pin Bottom
341 Shoulder of Valve Pin Bottom
5 Slider
51 Slider Spring
501 Orange Section
502 Black Section
503 Yellow Section
504 Bearing Rails
6 Base
61 Schrader Valve Seal
601 Ribs
602 Center Pin Alignment Tab
603 Slot
604 Hexagonal Extension
605 Tire Stem Threads
7 Diaphragm
701 Triangular Extensions
702 Tabs
703 Diaphragm Chamber
704 Air Channel Below Diaphragm
8 Center Pin
801 Slot
802 Base of Center Pin
803 Air Channel Inside Center Pin
804 Air Channel Outside Center Pin
9 Mirror FIG. 1 shows the preferred embodiment of the invention, as seen from the outside. The primary function of the preferred embodiment is to indicate whether the user's tire is at, above or below a preconfigured tire pressure. This is done by allowing one of three colors to show through the lens 2. Different sections of the slider 5 (or pressure indication sleeve) will show through the lens depending on the air pressure in the unit. The visible portion of the slider may be viewed from both the sides and the top. The mirror 9 will reflect the slider to increase the visibility of indication, especially from the top. When viewed from the top, colors of the indicator will have a "donut" or circular shape. The mirror should be at an acute angle from the visible surface of the indicator. The preferred embodiment is threaded on to the valve stem of a car tire through the base, and the tire stem threads 605 are cut into the base (see FIG. 4).

The color of the slider changes as the pressure inside of the tire changes (as described below). The indicator can be tuned to any target tire pressure in pounds per square inch ("PSI"). For example, it may be tuned to 34 PSI. When the pressure inside the tire matches the tuning pressure, only section 502 (see FIG. 3) will show. In the preferred embodiment, section 502 is black. Section 502 preferably matches the color of the top case 1 and base 6, so that it will blend with those parts.

Figure 3:
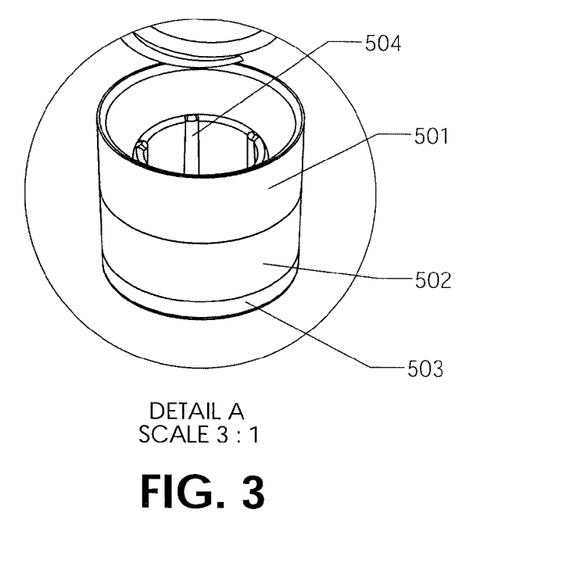
FIG. 3 is a detail view of the slider part of the preferred embodiment of the invention.

When the pressure inside the tire is above the tuning pressure, section 503 will be visible through the lens. In the preferred embodiment, section 503 is fluorescent yellow, so that it will contrast with the top case 1 and base 6, as well as section 502, so that the user will notice it and adjust the tire pressure accordingly. If the tire pressure drops below the tuning pressure, section 501 will start to show. In the preferred embodiment, section 501 will be fluorescent orange, so it will contrast with the other parts as well. As the tire pressure drops further, more of section 501 will be visible, until the tire reaches a pressure that is dangerously low (around 20% below the target pressure), where only section 501 will show. At this point, it should be obvious to the user that the tire needs to be filled. (Alternatively, any combination of three different colors may be used in sections 501, 502 and 503.)

The secondary function of the preferred embodiment is to allow users to fill their tire without removing the indicator. This allows for a small amount of security, as the user can tighten the invention on to a tire stem so that it cannot be removed without the use of tools. A hexagonal extension 604 has been added to the base of the unit so that a standard 7/16" or 11 mm wrench can be used to tighten and untighten the unit from the stem.

More importantly, it allows the user to use the invention to know when to stop filling the tire. The user places the air chuck over the top case extension 103. This extension is dimensioned and configured so that it seals against most air chucks. When the air chuck is placed on extension 103, the pin in the air chuck depresses the valve pin assembly 3. This opens the fill valve in the unit and allows air to flow into the device. The user can check the pressure of the tire periodically while filling, using the same indicator described above. The user will fill until only section 502 of the slider 5 is showing. If the user sees section 501 (orange—too low), he will know to pump more air in. If the user sees section 503 (yellow—too high), he will know to bleed air from the unit by depressing the valve pin assembly 3. By filling the tire in this manner, the user will not have to know the exact PSI of his (or her) tire, he (or she) will only have to know that he needs to fill the tire until only section 502 (black—just right) is showing.

The valve pin (or actuator) is designed to eliminate the need for a thread-on dust cap. It is different from that of the typical Schrader valve, in that it has a large top pin surface, to prevent larger dust particles from entering, and it is different from other extender caps in that it incorporates an airtight seal.

Figure 2:
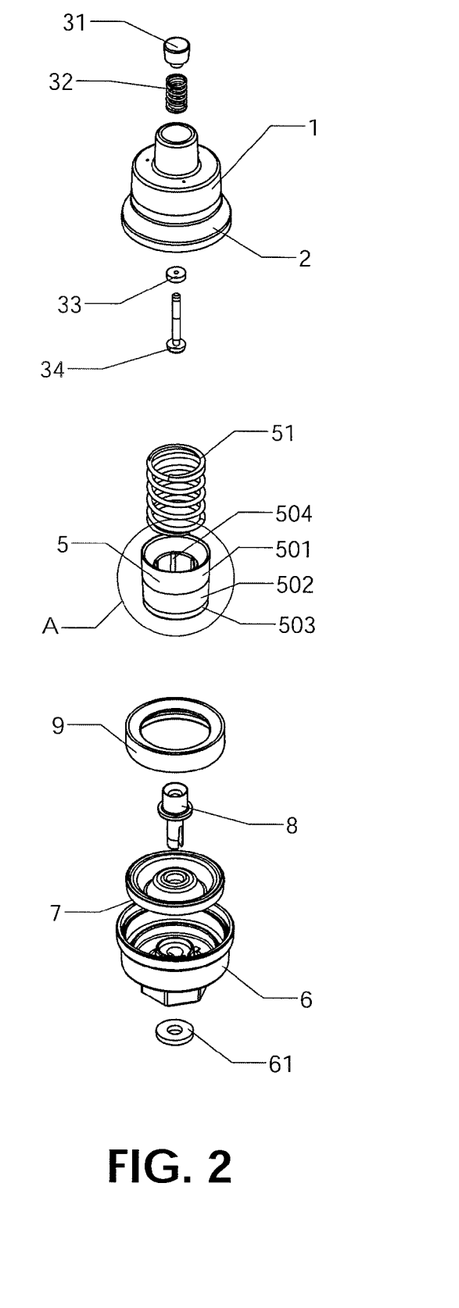
FIG. 2 is an exploded view of the preferred embodiment of the invention.

FIG. 2 shows all the major parts in an exploded view, including the top case 1, the lens 2, the valve pin top 31, the valve pin spring 32, the valve pin seal 33, the valve pin bottom 34, the slider 5, the slider spring 51, the base 6, the Schrader valve seal 61, the diaphragm 7, the center pin 8, and the mirror 9.

FIG. 3 shows a detail view of the slider, and calls out the separate color sections 501, 502 & 503, as well as a better view of the bearing rails 504.

Figures 4, 5, 6, 7:
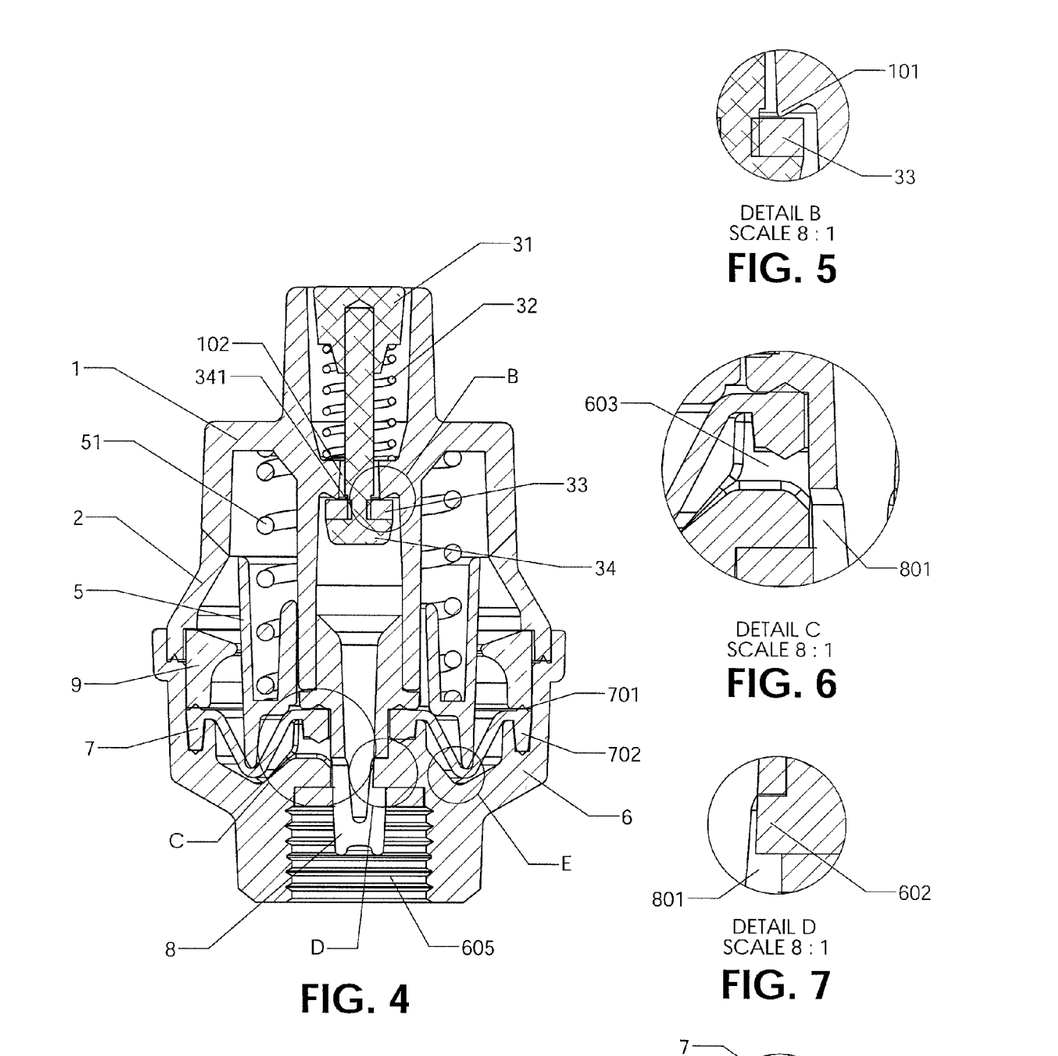
FIG. 4 is a sectional view of the preferred embodiment of the invention drawn along lines 4-4 of FIG. 1.
FIG. 5 is a detail view of the valve pin seal of the preferred embodiment of the invention.
FIG. 6 is a detail view of the air channel to the diaphragm chamber of the preferred embodiment of the invention.
FIG. 7 is a detail view of the center pin alignment tab on the base of the preferred embodiment of the invention.

FIG. 4 shows a sectional view of the assembled preferred embodiment. The preferred embodiment is assembled in sections, and then welded together.

The top case 1 and the lens 2 are molded together to form a single part. The valve pin seal 33 is pressed over the valve pin bottom 34 so that it rests under the shoulder 341, holding it in place. The valve pin bottom 34 is then threaded through the hole in the top case 102. The valve pin spring 32 is placed around the valve pin bottom 34, and then the valve pin top 31 is placed on top.

The diaphragm 7 is placed in the base 6. (Note that the diaphragm is a ring with a hole in its center through which air can pass.) The tabs 702 on the inside and outside of the diaphragm prevent the diaphragm from moving laterally under pressure and coming loose. The center pin 8 is press fit into the base using the center pin alignment tab 602 (see FIG. 7). The mirror 9 is press fit into the base as well. The triangles 701 (on the top and bottom of both tabs) on the diaphragm 7 will deform under the pressure of these press-fits, creating seals against the base 6, center pin 8 and mirror 9, making sure that the chambers above and below the diaphragm are sealed from each other. The Schrader valve seal 61 is placed into the bottom of the base around the center pin 8.

The slider spring 51 is placed into the slider 5, which is then placed on the diaphragm 7. Note that there is no sliding contact between the diaphragm and the slider, and thus no friction between them. The top case assembly is then pressed on to the center pin. The outside of the top case assembly, where the lens 2 meets the base 6, is ultrasonically welded together, strengthening the unit.

FIG. 5 shows a detail of the valve pin seal 33 against the top case 1. The surface of the top case has triangular extensions 101, to minimize the contact area against the valve pin seal 33. This means that the pressure against the sealing surface will be maximized, creating a strong seal. (Alternatively, there could be a sealing gasket where the triangular extensions are, instead of the valve pine seal.)

FIG. 6 shows a detail of the air channel to the diaphragm chamber. The slot in the center pin 801 matches up with a slot in the base 603, allowing air to pass through.

FIG. 7 shows a detail of the center pin alignment tab on the base 602. This tab is sized to fit in the same slot 801 as in FIG. 6, but on the other side of the pin. This ensures that the slot in the center pin 801 and the slot in the base 603 will align properly.

Figure 8:
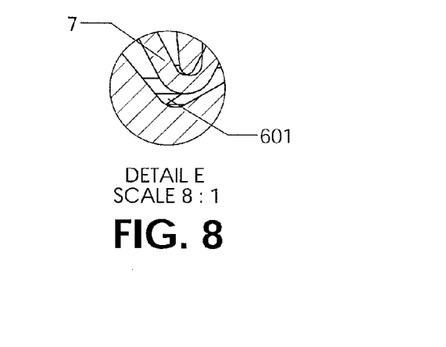
FIG. 8 is a detail view of the ribs on the base that allow air to pass underneath the diaphragm in the lowest position, in the preferred embodiment of the invention.

FIG. 8 shows a detail of the ribs on the base 601 that allow air to pass underneath the diaphragm, even if the diaphragm 7 is in its lowest position. The diaphragm 7 will bottom out on these ribs (there are six spread around the base). Air can pass underneath the diaphragm between these ribs. This is imperative for the diaphragm to invert properly from a concave up to a concave down position.

Figure 9:
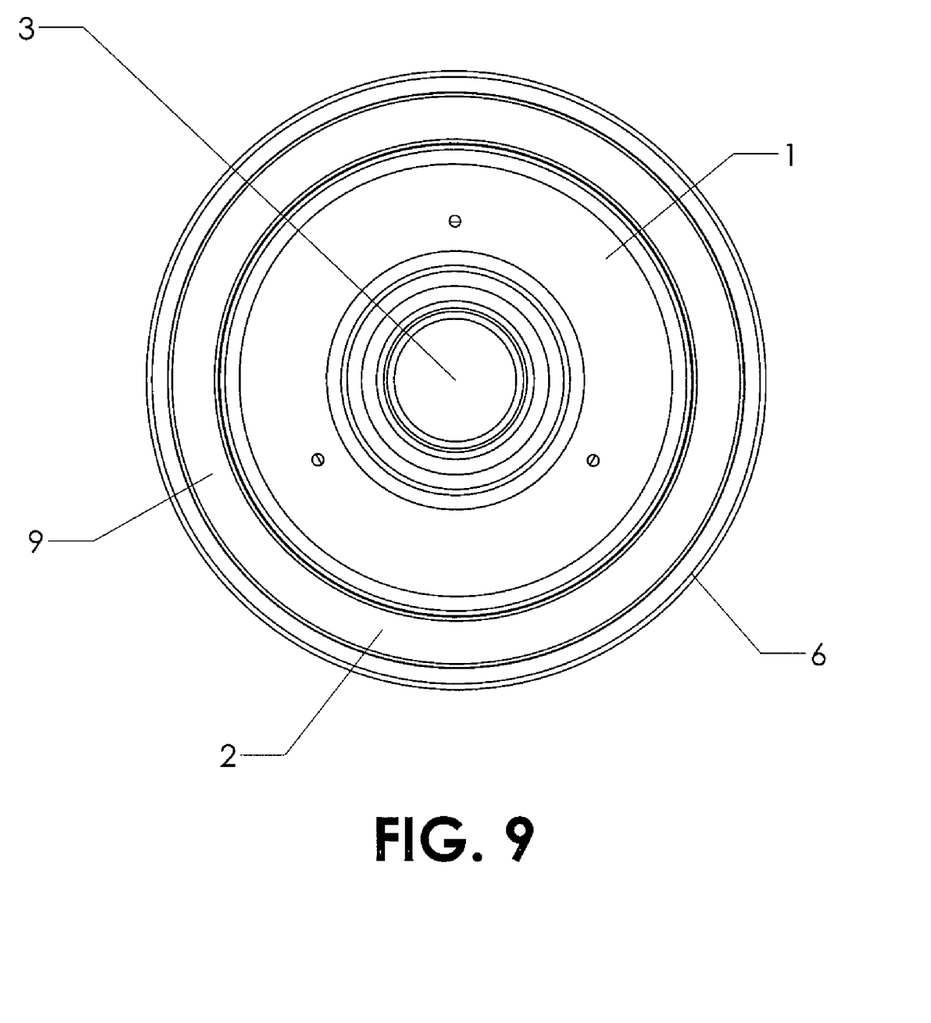
FIG. 9 is a top view of the preferred embodiment of the invention.

FIG. 9 shows a top view of the invention. With most indicators, no indication can be seen from the top, only from the side. The mirror 9 is angled so that it can reflect the slider 5 (not seen in this view) through the lens 2, allowing it to be seen from the top.

Figure 10:
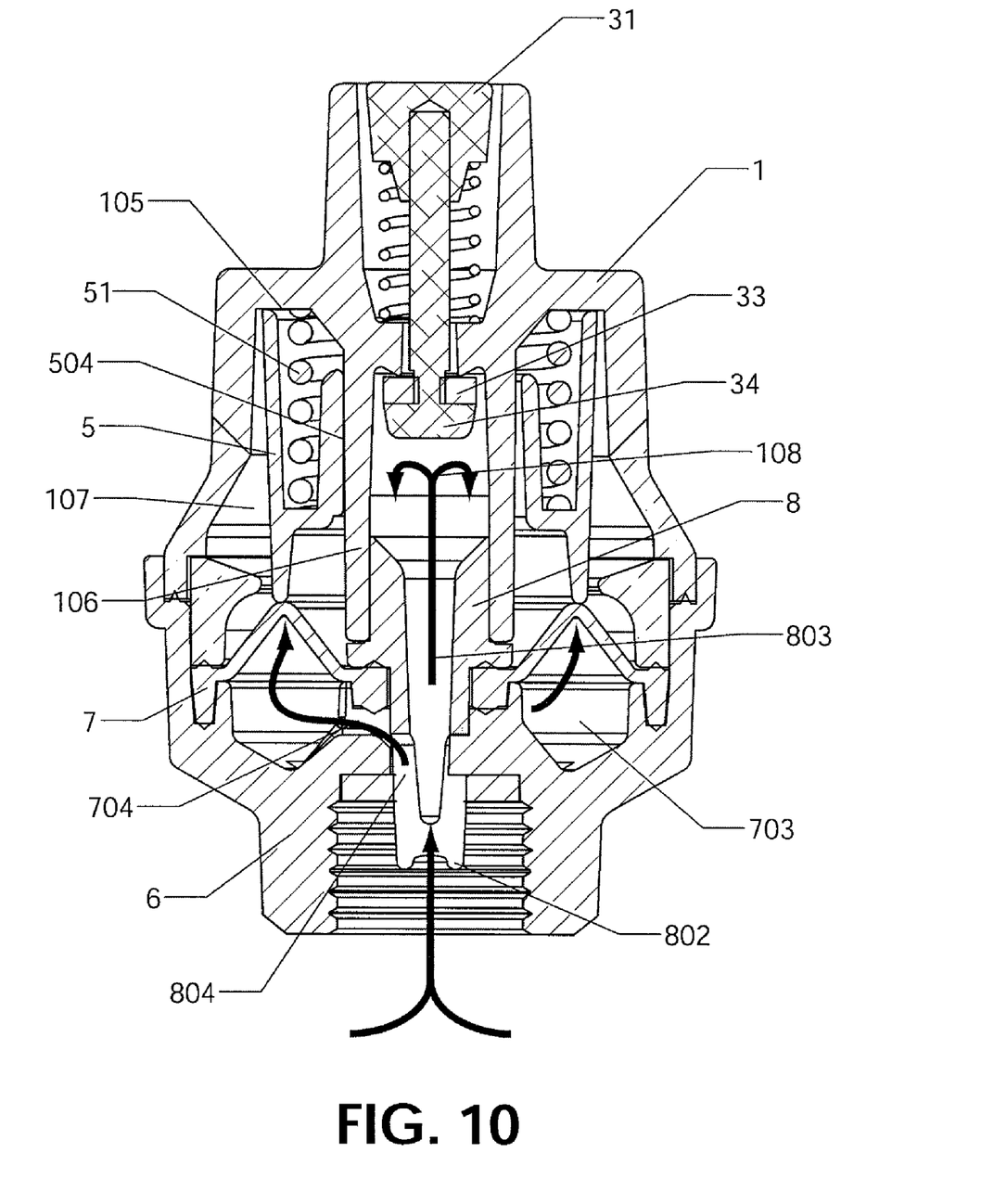
FIG. 10 is a sectional view along lines 4-4 of FIG. 1, showing the airflow paths for the activation mechanism, in the preferred embodiment of the invention.

FIG. 10 is a diagrammatic section view of the airflow during pressure indication. When the base 6 is threaded on the tire stem, the base of the center pin 802 depresses the valve pin of the tire stem, allowing air to leak out. This air leaks through the channel in the center pin 803 to the main air chamber 108. Since in this configuration, the valve pin of the preferred embodiment is up, the force of the valve pin spring 32 on the valve pin top 31 causes the valve pin seal 33 to compress against the top case 1, preventing air from leaking out.

Air can also leak through the air channels 804 and 704 to the diaphragm chamber 703. The diaphragm chamber 703 and the ambient air pressure chamber 107 are separated by the seals of the diaphragm. The ambient air pressure chamber 107 is kept at ambient air pressure by three vent holes in the top of the case 104 (see FIG. 1). (Other fluids may be substituted for air in the invention.) The pressure differential between the two chambers causes the higher air pressure in the diaphragm chamber 703 to exert a force on the diaphragm 7. This force is then exerted by the diaphragm 7 on the slider 5. The slider 5 then exerts the force on the slider spring 51. As the slider spring 51 compresses due to the force, it will exert an opposing force that increases linearly. It will also move upwards, as the slider bearing rails 504 (see also FIG. 3) slide along the center shaft 106 of the top case 1. These rails align the slider so that it will slide completely vertically and not bind on other features. When the force exerted by the slider spring 51 matches the force exerted on the diaphragm 7, the system will reach equilibrium and the slider will stay in place. If the system never reaches equilibrium due to the air pressure in the diaphragm chamber 703 being too high, the top of the slider will bottom out on the inside of the top case 105. In this configuration, section 503 (yellow band) of the slider will show, indicating that the pressure is too high.

Figure 11:
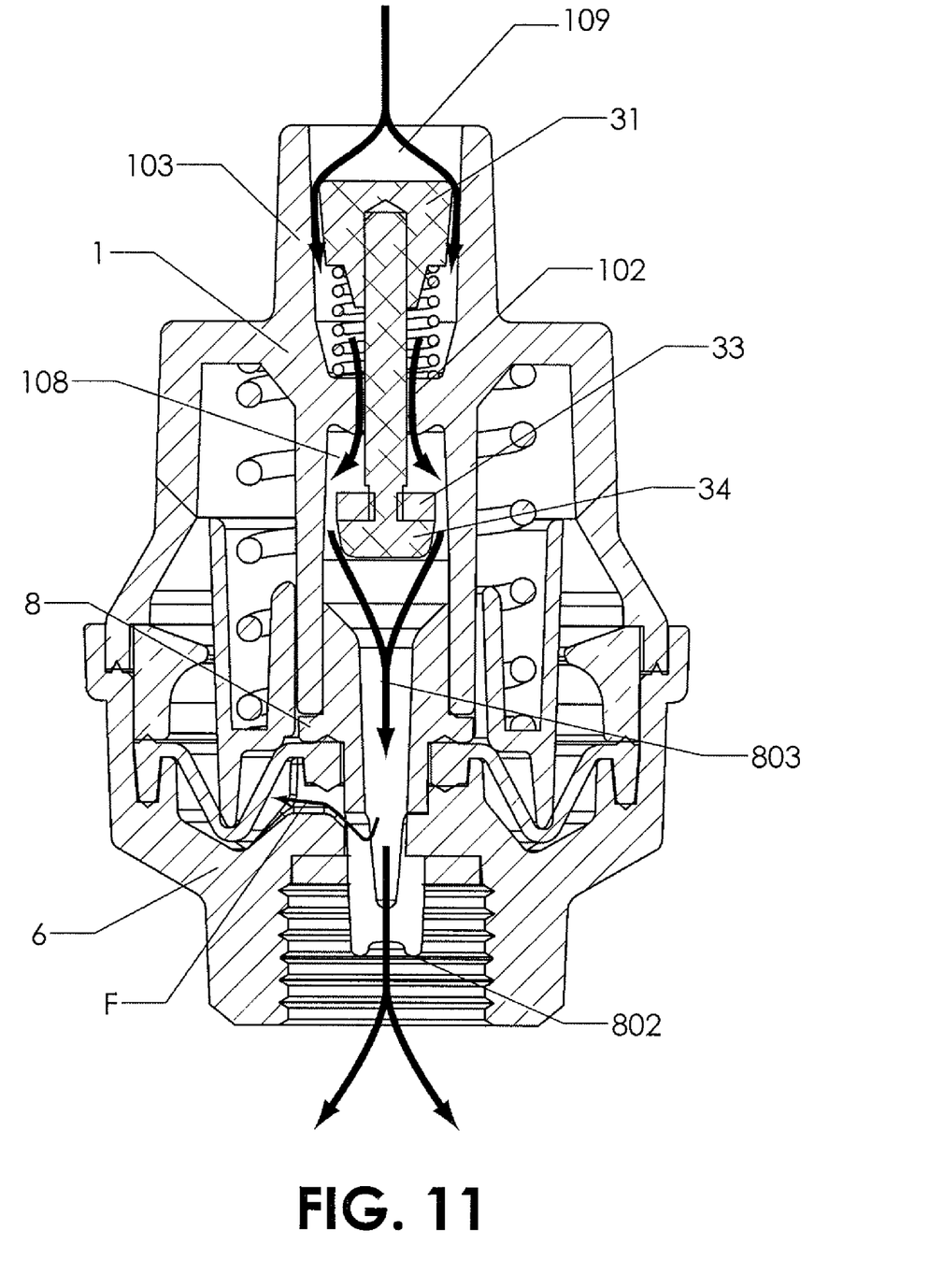
FIG. 11 is a sectional view along lines 4-4 of FIG. 1, showing the airflow paths when preferred embodiment of the invention is being used to fill a tire.

FIG. 11 is a diagrammatic section view of the airflow during filling of the tire with air. In this configuration, an air chuck is placed over the extension 103 in the top case 1. The pin in the air chuck presses down on the valve pin top 31. This compresses the valve pin spring 32 and causes the valve pin seal 33 to disengage its seal with the top case 1. Air flows into the fill chamber 109, through the hole in the top case 102 and into the main chamber 108. It then can flow through the air channel in the center pin 803 and into the tire, whose valve is still open by the base of the center pin 802 depressing the valve pin of the tire stem.

In this configuration, the air can also travel through the air channel to the diaphragm chamber (as shown by the arrow F). The unit will not show accurate indication while filling because the air rushing in (or out, in the case of bleeding) will affect the air pressure in the diaphragm chamber. To check the tire pressure, the user will need to pull the air chuck off the top case 1, allowing the valve pin seal 33 to move up against the top case 1, so that the pressure in the diaphragm chamber will match the tire pressure.

It is to be understood that the present invention is not limited to the sole embodiment described above, but encompasses any and all embodiments within the scope of the following claims.

We claim:

1. A fill-through pressure indicator, comprising:
a pressure indication sleeve concentric with a fill valve; and
a diaphragm that causes the pressure indication sleeve to move when pressure changes, without sliding contact in a seal;
wherein the fill valve has a pin that is biased towards a position that closes the fill valve by a valve pin spring, and when the fill valve is closed, fluid whose pressure is to be indicated flows into a diaphragm chamber on a first side of the diaphragm, while an ambient fluid chamber on an opposite second side of the diaphragm is separated from the diaphragm chamber by the diaphragm and its seals, and the ambient fluid chamber is kept at ambient fluid pressure by vent holes in a top casing.

2. The fill-through pressure indicator according to claim 1, wherein the ambient fluid is air.

3. A fill-through pressure indicator, comprising:
a pressure indication sleeve concentric with a fill valve; and
a diaphragm that causes the pressure indication sleeve to move when pressure changes, without sliding contact in a seal;
wherein the fill valve has a pin that is biased towards a position that closes the fill valve by a valve pin spring, but when the pin is depressed to open the fill valve:
if the pressure outside the fill valve is greater than the pressure inside an article to be inflated, then air can flow into a fill chamber, through a hole in a top casing, and into a main air chamber, then through a channel into the article being inflated; or
if the pressure outside the fill valve is less than the pressure inside an article to be deflated, then air can flow from the article through the channel into the main air chamber, then through the hole in the top casing into the fill chamber and out into the ambient air.

4. A fill-through pressure indicator, comprising:
a pressure indication sleeve concentric with a fill valve;
a mirror that reflects the surface of the pressure indication sleeve; and
a lens through which colors on the pressure indication sleeve are viewed;
wherein the fill valve has a pin that is biased towards a position that closes the fill valve by a valve pin spring, but when the pin is depressed to open the fill valve:
if the pressure outside the fill valve is greater than the pressure inside an article to be inflated, then air can flow into a fill chamber, through a hole in a top casing, and into a main air chamber, then through a channel into the article being inflated; or if the pressure outside the fill valve is less than the pressure inside an article to be deflated, then air can flow from the article through the channel into the main air chamber, then through the hole in the top casing into the fill chamber and out into the ambient air.

5. A fill-through pressure indicator, comprising:
a pressure indication sleeve concentric with a fill valve;
wherein the fill valve has an actuator with a large enough top surface to prevent larger dust particles from entering when the fill valve is closed;
wherein there is an airtight seal within the fill valve when it is closed; and
wherein the fill valve has a pin that is biased towards a position that closes the fill valve by a valve pin spring, but when the pin is depressed to open the fill valve:
if the pressure outside the fill valve is greater than the pressure inside an article to be inflated, then air can flow into a fill chamber, through a hole in a top casing, and into a main air chamber, then through a channel into the article being inflated; or
if the pressure outside the fill valve is less than the pressure inside an article to be deflated, then air can flow from the article through the channel into the main air chamber, then through the hole in the top casing into the fill chamber and out into the ambient air.

\* \* \* \* \*